Figures 1, 2:
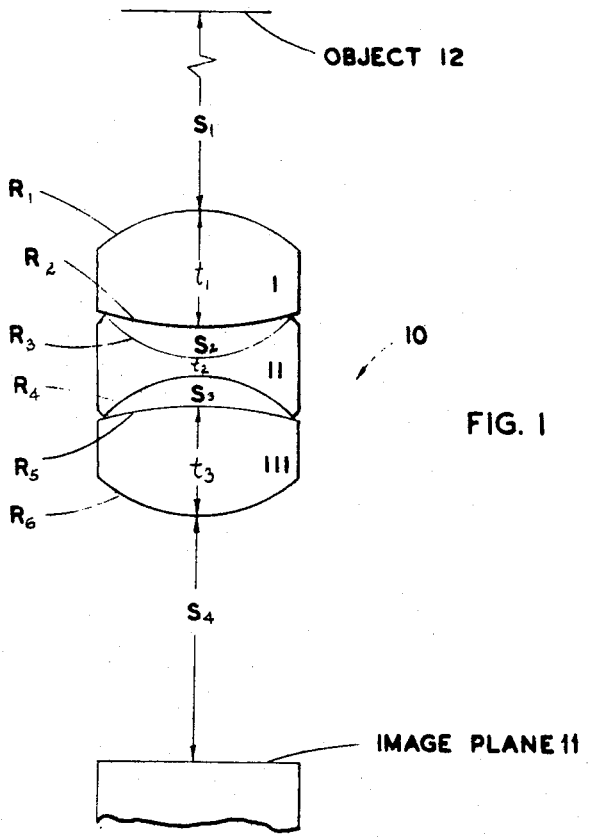

March 1, 1966 N. RICKLESS ET AL 3,237,520

SYMMETRICAL THREE ELEMENT PROJECTION LENS SYSTEM

Filed Dec. 11, 1962

| E.F.L. = 7.26 | | f/3.5 AT INFINITY | | | | |
|---|---|---|---|---|---|---|
| LENS | FOCAL LENGTH | RADII | THICKNESS | SPACES | $n_D$ | $\nu$ |
| I | $F_I = 3.6887$ | $R_1 = 2.9107$ | $t_1 = 2.2$ | $S_1 = 50.0$ | 1.620 | 60.3 |
| | | $-R_2 = 7.5858$ | | | | |
| II | $F_{II} = -1.8764$ | $-R_3 = 2.5119$ | $t_2 = 0.4$ | $S_2 = 0.55$ | 1.649 | 33.8 |
| | | $R_4 = 2.5119$ | | $S_3 = 0.55$ | | |
| III | $F_{III} = 3.6887$ | $R_5 = 7.5858$ | $t_3 = 2.2$ | $S_4 = 4.7$ | 1.620 | 60.3 |
| | | $-R_6 = 2.9107$ | | | | |

NATHAN RICKLESS
PAUL L. RUBEN
*INVENTOR.*

BY *Frank C. Parker*

ATTORNEY 3,237,520
SYMMETRICAL THREE ELEMENT PROJECTION
LENS SYSTEM
Nathan Rickless, Brighton, and Paul L. Ruben, Rochester, N.Y., assignors to Bausch & Lomb Incorporated, Rochester, N.Y., a corporation of New York
Filed Dec. 11, 1962, Ser. No. 243,781
6 Claims. (Cl. 88—57)

The present invention relates to projection lens systems and more particularly to improvements in a symmetrical triplet type of lens system.

It is an object of the present invention to provide a novel triplet type of symmetrical lens system of simple design which is especially suited to low cost manufacturing techniques, and has high quality performance characteristics, the system having a relative aperture of at least $f/3.5$ at infinity and being well corrected for spherical and chromatic aberrations as well as coma, astigmatism and field curvature.

Further objects and advantages will be apparent to those skilled in optical practice, from a study of the following specification taken in connection with the accompanying drawing, wherein FIG. 1 is an optical diagram of a symmetrical lens system according to the present invention, and FIG. 2 is a chart of numerical constructional data relating to a preferred form of the optical system shown in FIG. 1.

In the drawing, the aforesaid lens system is generally designated by the numeral 10, said system forming an image at the image plane 11 of the surface of an object 12. Said lens system 10 works at unequal conjugates up to and beyond 10:1 with good optical performance as above stated and has a relative aperture of at least $f/3.5$ at infinity.

According to the present invention, the optical system is extremely simple and easy to manufacture, resulting in a very low cost. As aforesaid this simplicity and low cost are achieved without sacrificing good optical performance as judged by the character of the corrections for spherical and chromatic aberrations, coma, astigmatism, distortion and field curvature.

For achieving the above mentioned favorable characteristics, a pair of preferably substantially duplicate double convex lenses I and III are provided having their strongest refractive curvatures turned outwardly. Between said lenses I and III is held a substantially symmetrical double concave lens II in contact on its opposite peripheral edges with the lenses I and III. All of said lenses are preferably singlet in form and are optically aligned with each other. To attain favorably the objects of this invention, the focal lengths $F_I$ and $F_{III}$ of the front and rear lenses I and III as well as the focal length $-F_{II}$ of the central lens II have values as given the mathematical statements herebelow:

$.48F<F_I<.52F$
$.24F<-F_{II}<.27F$
$.48F<F_{III}<.52F$ wherein F designates the equivalent focal length of the lens system 10 and the minus (—) sign denotes negative power. Furthermore, the specification for the axial thicknesses $t_1$, $t_2$ and $t_3$ of the successive lens members I, II and III respectively should have numerical values as given in the mathematical statements herebelow:

$.273F<t_1<.333F$
$.050F<t_2<.060F$
$.273F<t_3<.333F$
$.15t_1<t_2<.22t_1$

The interlens axial airspaces $S_2$ and $S_3$ should be substantially equal to each other and should have a numerical value lying between $.0683F$ and $.0833F$.

The radii $R_1$ to $R_6$ of the successive lens surfaces in the adjacent lenses I to III should have numerical values as given in the table of mathematical statements herebelow:

$.36F<R_1<.44F$
$.94F<-R_2<1.14F$
$.311F<-R_3<.380F$
$.311F<R_4<.380F$
$.94F<R_5<1.14F$
$.36F<-R_6<.44F$
$.345<R_1/R_2<.421$ wherein the minus (—) sign used with the R values signifies that the center of curvature for such a radius lies on the object side of the vertex of the respective lens surface. Correspondingly the refractive index $n_D$ and Abbe number $\nu$ of the materials from which the lenses I to III are made should be as stated herebelow:

$1.615<n_D(I)$ or $n_D(III)<1.625$
$50.0<\nu(I)$ or $\nu(III)<62.0$
$1.644<n_D(II)<1.654$
$28.0<\nu(II)<38.0$

More specifically, the numerical values for lens radii, thickness and spacing together with the specifications for refractive index and Abbe number of the lens materials is set forth in the table of mathematical statements herebelow wherein the designations remain the same as hereabove:

$R_1$ and $-R_6=.401F$
$-R_2$ and $R_5=1.04F$
$-R_3$ and $R_4=.3455F$
$t_1=t_3=.303F$
$t_2=.055F$
$S_2=S_3=.0758F$
$S_1/S_4 \geqslant 10.0$ wherein $S_1$ represents the object distance and $S_4$ represents the image distance:

$n_D(I)=n_D(III)=1.620$ substantially
$n_D(II)=1.649$ substantially
$\nu(I)=\nu(III)=60.3$ substantially
$\nu(II)=33.8$ substantially The constructional data for one preferred form of said lens system is given numerically in the chart of values provided herebelow wherein the designations for the optical parameters remain the same as in the previous tables.

[E.F.L.=7.26  f/3.5 at infinity]

| Lens | Focal Lengths | Radii | Thicknesses | Spacings | $n_D$ | $\nu$ |
|---|---|---|---|---|---|---|
| A | $F_I = 3.6887$ | $R_1 = 2.9107$ | $t_1 = 2.2$ | $S_1 = 50.0$ | 1.620 | 60.3 |
|   |                | $-R_2 = 7.5858$ |             | $S_2 = 0.55$ |       |      |
| B | $F_{II} = 1.8764$ | $-R_3 = 2.5119$ | $t_2 = 0.4$ | $S_3 = 0.55$ | 1.649 | 33.8 |
|   |                | $R_4 = 2.5119$ |             | $S_4 = 4.7$ |       |      |
| C | $F_{III} = 3.6887$ | $R_5 = 7.5858$ | $t_3 = 2.2$ |         | 1.620 | 60.3 |
|   |                | $R_6 = 2.9107$ |             |         |       |      |

Although only a single embodiment of the present invention has been shown and described in detail, it will be understood that other embodiments are possible and changes may be made in the specific values of the optical parameters within the ranges above outlined without departing from the spirit of this invention as defined in the appended claims.

We claim:

1. A triplet type of symmetrical lens system for optical projection devices having a relative aperture of at least $f/3.5$ at infinity and consisting of
   a pair of substantially identical double convex singlet lenses having their surfaces of strongest curvature turned outwardly, and further consisting of
   a double concave singlet lens which is located between said pair of double convex singlet lenses and has edge contact on its opposite sides with the adjacent convex surfaces of said pair of double convex lenses,
   said double convex lenses having substantially equal positive focal lengths which have a numerical value lying between .48F and .52F wherein F denotes the equivalent focal length of said system,
   the numerical value of the negative focal length of said double concave lens lying between $-.24F$ and $-.27F$,
   the axial thickness $t_2$ of the double concave lens relative to the axial thicknesses $t_1$ and $t_3$ of said double convex lenses being as stated in the mathematical expression herebelow:
   $.17t_1 < t_2 < .20t_1$
   and $t_2$ being between .050F and .060F.

2. A triplet type of symmetrical lens system for optical projection devices having a relative aperture of at least $f/3.5$ at infinity as set forth in claim 1 further characterized by said double convex lenses having a refractive index value from 1.615 to 1.625, and having an Abbe number value from 50.0 to 62.0, said double concave lens having a refractive index from 1.644 to 1.654 and an Abbe number from 28.0 to 38.0.

3. A triplet type of symmetrical lens system for optical projection devices having a relative aperture of at least $f/3.5$ at infinity and consisting of
   a pair of substantially identical double convex singlet lenses and an interposed double concave singlet lens having edge contact with said double convex lenses,
   the outermost radii of the double convex lenses being designated $R_1$ and $R_6$ and being substantially equal to each other, and the innermost radii thereof being designated $R_2$ and $R_5$ and being substantially equal to each other, the ratio $R_1/R_2$ having a range of numerical values at stated mathematically herebelow
   $.345 < R_1/R_2 < .421$
   both of the refractive concave surfaces which are designated $R_3$ and $R_4$ of said double concave lens having a numerical radius value which is individually stated in the range herebelow:
   $.31F < -R_3 < .38F$
   $.31F < R_4 < .38F$
   wherein F designates the equivalent focal length of said lens system, and
   the numerical value of the axial thickness $t_2$ of the double concave lens relative to the axial thickness $t_1$ of one double convex lens being expressed by the mathematical statement herebelow:
   $.15t_1 < t_2 < .22t_1$ 4. A triplet type of symmetrical lens system for optical projection devices having a relative aperture of at least $f/3.5$ at infinity and consisting of
   a pair of substantially identical double convex singlet lenses designated I and III having their surfaces of strongest curvature turned outwardly, and further consisting of
   an interposed double concave singlet lens designated II which has edge contact on opposite sides with said pair of double convex lenses,
   certain optical parameters of said system being given in the table of values herebelow wherein F designates the equivalent focal length of said system, $R_1$ to $R_6$ designates the successive lens surfaces, and the minus (—) sign applies to those lens radii which have their centers of curvature located on the object side of the vertex of their lens surfaces, $t_1$ to $t_3$ designate the axial thicknesses of the successive lenses I to III, $S_2$ and $S_3$ represent the successive interlens axial airspaces, and $n_D$ and $\nu$ denote the refractive index and Abbe number respectively of the lens materials:

$.36F < R_1 < .44F$
   $.94F < R_2 < 1.14F$
   $.311F < -R_3 < .380F$
   $.311F < R_4 < .380F$
   $.94F < F_5 < 1.14F$
   $.36F < -R_6 < .44F$
   $.273F < t_1 < .333F$
   $.050F < t_2 < .060F$
   $.273F < t_3 < .333F$
   $.0683F < S_2 < .0833F$
   $.0683F < S_3 < .0833F$
   $1.615 < n_D(I) < 1.625$
   $1.615 < n_D(III) < 1.625$
   $50.0 < \nu(I) < 62.0$
   $50.0 < \nu(III) < 62.0$
   $1.644 < n_D(II) < 1.654$
   $28.0 < \nu(II) < 38.0$

5. A triplet type of symmetrical projection lens system having a relative aperture of at least $f/3.5$ at infinity and composed of
   a pair of double convex lenses designated I and III and a double concave lens located therebetween designated II which has edge contact on both sides with said double convex lenses,
   the optical parameters of said system being given in the table of mathematical statements herebelow wherein $R_1$ to $R_6$ represent the radii of curvature of the successive lens surfaces, $t_1$ to $t_3$ represent the axial thicknesses of the successive lenses I to III, $S_1$ and $S_4$ represent the object distance and image distance respectively, $S_2$ and $S_3$ designate the interlens airspaces, and $n_D$ and $\nu$ denote the refractive index and Abbe number respectively of the lens materials, wherein the minus (—) sign used with the $R_1$ to $R_6$ values signifies that the center of curvature of such a radius lies on the object side of the vertex of the respective lens surface, and wherein F represents the equivalent focal length of said system:

$R_1$ and $-R_6 = .401F$
   $-R_2$ and $R_5 = 1.04F$
   $-R_3$ and $R_4 = .3455F$
   $t_1 = t_3 = .303F$
   $t_2 = .055F$
   $S_2 = S_3 = .0758F$
   $S_1/S_4 \geq 10.0$
   $n_D(I) = n_D(III) = 1.620$ substantially
   $n_D(II) = 1.649$ substantially
   $\nu(I) = \nu(III) = 60.3$ substantially
   $\nu(II) = 33.8$ substantially 6. A triplet type of symmetrical lens system composed of two duplicate collective lenses and an interposed dispersive lens having edge contact with said collective lenses, the numerical values of the optical parameters of said system being given in the chart herebelow wherein E.F.L. designates the equivalent focal length of said objective, $R_1$ to $R_6$ designate the radii of the successive lens surfaces numbering from the front of the system, the minus (—) sign used therewith applies to a lens surface having its center of curvature lying on the object side of the vertex of said surface, the focal lengths of the successive lenses I to III being designated $F_I$ to $F_{III}$ respectively, $t_1$ to $t_3$ representing the successive lens thicknesses, $S_1$ and $S_4$ representing the object distance and image distance respectively, and $n_D$ and $\nu$ representing respectively the refractive index and Abbe number of the successive lens materials,

[E.F.L. = 7.26    f/3.5 at infinity]

| Lens | Focal Lengths | Radii | Thicknesses | Spacings | $n_D$ | $\nu$ |
|---|---|---|---|---|---|---|
| A | $F_I = 3.6887$ | $R_1 = 2.9107$ | $t_1 = 2.2$ | $S_1 = 50.0$ | 1.620 | 60.3 |
|   |   | $-R_2 = 7.5858$ |   | $S_2 = 0.55$ |   |   |
| B | $F_{II} = -1.8764$ | $-R_3 = 2.5119$ | $t_2 = 0.4$ | $S_3 = 0.55$ | 1.649 | 33.8 |
|   |   | $R_4 = 2.5119$ |   | $S_4 = 4.7$ |   |   |
| C | $F_{III} = 3.6887$ | $R_5 = 7.5858$ | $t_3 = 2.2$ |   | 1.620 | 60.3 |
|   |   | $-R_6 = 2.9107$ |   |   |   |   |

No references cited.

JEWELL H. PEDERSEN, *Primary Examiner.*
JOHN K. CORBIN, *Examiner.*